(12) United States Patent
Kaltchev

(10) Patent No.: US 10,166,715 B2
(45) Date of Patent: Jan. 1, 2019

(54) METHOD AND DEVICE FOR APPLYING PROTECTIVE SHEETING OF POLYMER MATERIAL TO A PIPELINE

(71) Applicant: SAIPEM S.p.A., San Donato Milanese (IT)

(72) Inventor: Momtchil Kaltchev, Carpiano (IT)

(73) Assignee: SAIPEM S.p.A., San Donato Milanese (IT)

( * ) Notice: Subject to any disclaimer, the term of this patent is extended or adjusted under 35 U.S.C. 154(b) by 263 days.

(21) Appl. No.: 15/030,552

(22) PCT Filed: Oct. 24, 2014

(86) PCT No.: PCT/IB2014/065592
§ 371 (c)(1),
(2) Date: Apr. 19, 2016

(87) PCT Pub. No.: WO2015/059673
PCT Pub. Date: Apr. 30, 2015

(65) Prior Publication Data
US 2016/0236401 A1 Aug. 18, 2016

(30) Foreign Application Priority Data

Oct. 24, 2013 (IT) .............................. MI2013A1777

(51) Int. Cl.
*F16L 58/18* (2006.01)
*B29C 63/06* (2006.01)
(Continued)

(52) U.S. Cl.
CPC .......... *B29C 63/06* (2013.01); *B29C 47/0021* (2013.01); *B29C 47/021* (2013.01);
(Continued)

(58) Field of Classification Search
CPC .. F16L 58/181; F16L 13/0272; B29C 47/021; B29C 47/0866; B29C 63/06; B05D 1/265
See application file for complete search history.

(56) References Cited

U.S. PATENT DOCUMENTS

| | | | |
|---|---|---|---|
| 6,911,089 B2 * | 6/2005 | Latvis | B05B 13/0436 118/666 |
| 2008/0079260 A1 * | 4/2008 | Duncan | F16L 58/1063 285/47 |

(Continued)

FOREIGN PATENT DOCUMENTS

| | | |
|---|---|---|
| EP | 1 985 909 A1 | 10/2008 |
| WO | WO 2007/079720 | 7/2007 |

(Continued)

OTHER PUBLICATIONS

WIPO Letter for International Application No. PCT/IB2014/065592 dated Apr. 5, 2016.
(Continued)

*Primary Examiner* — Carson Gross
(74) *Attorney, Agent, or Firm* — Neal, Gerber & Eisenberg LLP

(57) ABSTRACT

A method of applying protective sheeting of polymer material to a pipeline extending along a longitudinal axis and having a cutback bounded at opposite axial ends by two end portions of respective protective coatings of polymer material, the method including directly heating the free faces of the end portions; extruding and simultaneously winding about the pipeline a protective sheeting wide enough to cover the cutback and the end portions; and compressing the protective sheeting against the pipeline, the end portions included.

7 Claims, 4 Drawing Sheets

(51) Int. Cl.
| | |
|---|---|
| B29C 47/02 | (2006.01) |
| B29C 47/08 | (2006.01) |
| B29C 63/00 | (2006.01) |
| B29C 63/02 | (2006.01) |
| B29C 63/04 | (2006.01) |
| F16L 13/02 | (2006.01) |
| B29C 47/14 | (2006.01) |
| B29C 47/00 | (2006.01) |
| B29C 63/48 | (2006.01) |
| B29C 65/10 | (2006.01) |
| B29C 65/00 | (2006.01) |
| B29C 65/02 | (2006.01) |
| B05D 1/26 | (2006.01) |
| B29K 23/00 | (2006.01) |
| B29L 23/00 | (2006.01) |

(52) U.S. Cl.
CPC ........ *B29C 47/028* (2013.01); *B29C 47/0866* (2013.01); *B29C 47/14* (2013.01); *B29C 63/0069* (2013.01); *B29C 63/024* (2013.01); *B29C 63/048* (2013.01); *B29C 63/48* (2013.01); *B29C 65/028* (2013.01); *B29C 65/10* (2013.01); *B29C 65/106* (2013.01); *B29C 66/112* (2013.01); *B29C 66/116* (2013.01); *B29C 66/1122* (2013.01); *B29C 66/5326* (2013.01); *B29C 66/652* (2013.01); *B29C 66/81431* (2013.01); *B29C 66/8362* (2013.01); *F16L 13/0272* (2013.01); *F16L 58/181* (2013.01); *B05D 1/265* (2013.01); *B29K 2023/06* (2013.01); *B29K 2023/12* (2013.01); *B29L 2023/22* (2013.01); *B29L 2023/225* (2013.01)

(56) References Cited

U.S. PATENT DOCUMENTS

| | | | |
|---|---|---|---|
| 2010/0254687 A1 | 10/2010 | George et al. | |
| 2011/0297316 A1* | 12/2011 | Jackson | B29C 45/14336 156/330 |
| 2012/0231168 A1* | 9/2012 | Leiden | B23K 9/18 427/359 |

FOREIGN PATENT DOCUMENTS

| | | |
|---|---|---|
| WO | WO 2008/071773 | 6/2008 |
| WO | WO 2008/132279 | 11/2008 |
| WO | WO 2010/049353 | 5/2010 |
| WO | WO 2011/033176 | 3/2011 |
| WO | WO 2012/172451 | 12/2012 |

OTHER PUBLICATIONS

Notification Concerning Submission, Obtention or Transmittal of Priority Document for International Application No. PCT/IB2014/065592 dated Jan. 28, 2015.
International Search Report and Written Opinion for International Application No. PCT/IB2014/065592 dated Feb. 10, 2015.
PCT Demand for International Preliminary Examination and Reply to International Search Report and the associated Written Opinion for International Application No. PCT/IB2014/065592 dated Aug. 24, 2015.
Notification of Receipt of Demand by Competent International Preliminary Examining Authority (Form PCT/IPEA/402) for International Application No. PCT/IB2014/065592 dated Aug. 28, 2015.
Second Written Opinion of the International Preliminary Examining Authority for International Application No. PCT/IB2014/065592 dated Oct. 6, 2015.
Reply to the Second Written Opinion of the International Searching Authority for International Application No. PCT/IB2014/065592 dated Dec. 2, 2015.
Notification Concerning Informal Communications with the Applicant for International Application No. PCT/IB2014/065592 dated Jan. 28, 2016.
Reply to the Notification for International Application No. PCT/IB2014/065592 dated Feb. 1, 2016.
Notification of Transmittal of the International Preliminary Report on Patentability (Form PCT/IPEA/416) for International Application No. International Application No. PCT/IB2014/065592 dated Mar. 1, 2016.

* cited by examiner

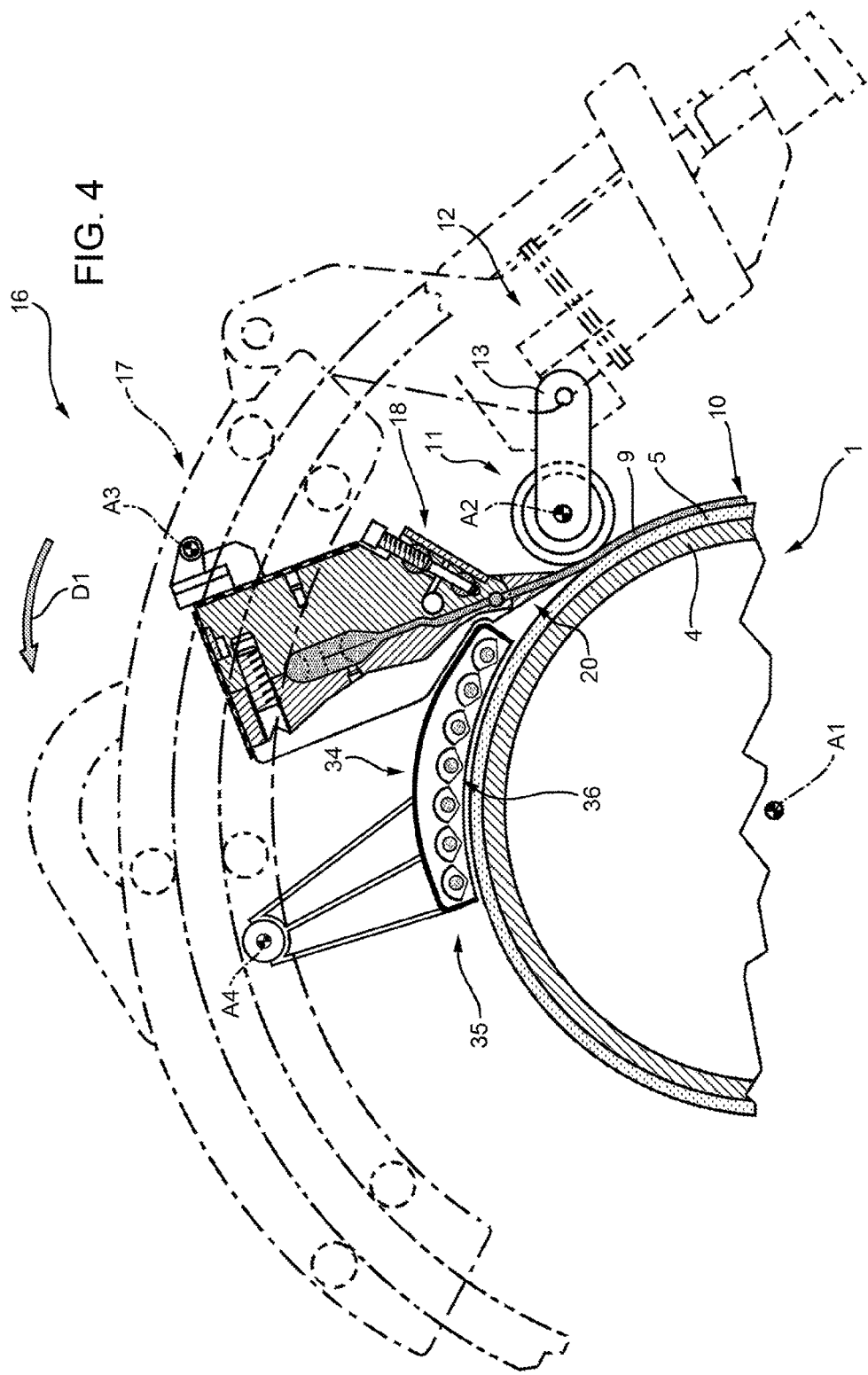

METHOD AND DEVICE FOR APPLYING PROTECTIVE SHEETING OF POLYMER MATERIAL TO A PIPELINE

PRIORITY CLAIM

This application is a national stage application of PCT/IB2014/065592, filed on Oct. 24, 2014, which claims the benefit of and priority to Italian Patent Application No. MI2013A001777, filed on Oct. 24, 2013, the entire contents of which are each incorporated by reference herein.

BACKGROUND

Certain methods of applying protective sheeting of polymer material to a pipeline are employed in pipeline construction, in particular the construction of underwater pipelines to be laid on the bed of a body of water, and to which the following description refers purely by way of example. Underwater pipelines are normally constructed by joining the facing free ends of adjacent pipes aligned along a longitudinal axis to define a cutback; and winding protective sheeting about the cutback and said end portions. Certain pipelines are composed of pipes joined to one another to cover distances of hundreds of kilometers. The pipes are of normally 12-meter standard length and of relatively large diameter ranging from 0.2 to 1.5 meters. Each pipe comprises a metal cylinder; and a polymer coating for protecting the metal cylinder. The opposite free ends of each pipe have no coating, so the metal cylinders can be welded to one another. The pipes may be joined at land-based installations, or on laying vessels which also provide for laying the pipeline as the pipeline is constructed.

The joining operation comprises welding the metal cylinders together, normally with a number of weld passes; and coating the cutback. Once an annular weld bead is formed between two adjacent metal cylinders, the cutback extends astride the annular weld bead, along an uncoated portion. In other words, the cutback is substantially defined by the free ends of the pipes, extends axially between two end portions of the protective coatings, and must be coated with a protective coating to prevent corrosion.

Coating the unprotected portion along the cutback is known as 'Field Joint Coating', and comprises winding thick, 2-10 mm thick, protective sheeting about the cutback. The protecting sheeting is extruded, and is simultaneously wound about the cutback as the protective sheeting is formed. This method is described in Applicant's PCT Patent Application No. WO 2008/071773 and in EP Patent Application No. 1,985,909, PCT Patent Application No. WO 2010/049353, and PCT Patent Application No. WO 2011/033176. In the methods described in these documents, the protective sheeting is applied by an extrusion die mounted on a carriage which runs along an annular path about the longitudinal axis of the pipeline, and the polymer material is plastified by a plastifying device located close to the pipeline and either connectable selectively to the extrusion die, or connected to the extrusion die by a hose or semirigid pipe.

The protective sheeting is also applied to the two end portions of respective pre-existing coatings, and is pressed onto the pipeline to ensure the protective sheeting adheres properly.

When field joint coating, it is essential to seal the protective sheeting to the end portions of the pre-existing coatings to prevent infiltration and form a seamless coating along the entire pipeline.

To seal the pre-existing coatings to the protective sheeting, PCT Patent Application No. WO 2007/079720 A1 proposes heating the metal cylinder by an induction heater, so the metal cylinder transmits heat by conduction to the protective sheeting and the end portions.

The above method calls for a relative enormous amount of thermal energy, which is dispersed and may endanger adhesion of the end portions of the pre-existing coating to the metal cylinder.

SUMMARY

The present disclosure relates to a method of applying protective sheeting of polymer material to a pipeline.

More specifically, the present disclosure relates to a method of applying protective sheeting of polymer material to a pipeline which has a longitudinal axis and comprises a cutback bounded at opposite axial ends by two end portions of respective protective coatings of polymer material. Generally, the method comprises winding the protective sheeting about the cutback and over the end portions; and compressing the protective sheeting onto the pipeline to ensure the protective sheeting adheres to the pipeline, and to prevent the formation of air bubbles.

It is an advantage of the present disclosure to provide a method of applying protective sheeting, configured to eliminate certain of the drawbacks of certain of the known art.

According to the present disclosure, there is provided a method of applying protective sheeting of polymer material to a pipeline; the pipeline extending along a longitudinal axis and comprising a cutback bounded at opposite axial ends by two end portions of respective protective coatings of polymer material; and the method comprising the steps of rotating a carriage about the pipeline; directly heating the free faces of the end portions by a heat treating unit comprising at least two heaters configured to direct and confine heat onto the end portions; extruding and simultaneously winding about the pipeline a protective sheeting wide enough to cover the cutback and the end portions; and compressing the protective sheeting against the pipeline, the end portions included, wherein the extrusion die and the heat treating unit are mounted on the carriage so that the heaters are located between the extrusion die and the pipeline. This way, effective adhesion between the end portions of the pre-existing coatings and the protective sheeting is achieved without impairing adhesion of the pre-existing coatings to the metal cylinder. Moreover, the amount of heat applied directly to the free faces of the end portions is independent of the thickness of the pre-existing coating, whereas the amount of heat applied to the free faces through the metal cylinder depends on the thickness of the pre-existing coating.

In certain embodiments of the present disclosure, the method comprises the steps of softening, by heating, a surface layer of each end portion; and applying the protective sheeting, not completely hardened, onto the softened surface layers. The protective sheeting is thus sealed effectively to the end portions of the pre-existing coatings.

In certain embodiments, the step of heating the free faces of the end portions comprises directing hot air or radiation or flame onto the free faces of the end portions.

The way in which the free faces of the end portions are heated may be selected according to the type of polymer material and the operating parameters. More specifically, heat may be transmitted to the end portions by convection, 'flame spraying', or irradiation.

In certain embodiments, the heating step comprises generating heat by at least one heat source selected from the following: infrared lamp, electric resistor, gas emitter, and gas burner.

In certain embodiments, the heating step comprises generating an airflow which intercepts the heat source; directing the hot airflow onto the free faces of the end portions; and moving the heat source and the hot airflow around the pipeline. This way, heating is targeted and effective immediately.

In an alternative embodiment, the method according to the present disclosure comprises generating and directing flames onto the end portions by at least two heat sources; and moving the heat sources and the flames around the pipeline. In other words, two heat sources facing the end portions generate and direct flames onto the end portions to immediately and temporarily increase the temperature along the surface layers of the end portions.

In another alternative embodiment, the method according to the present disclosure comprises generating electromagnetic radiation by at least two heat sources; directing the electromagnetic radiation onto the end portions; and moving the heat sources and the electromagnetic radiation around the pipeline. This type of heat source can be supplied electrically, and so enables for implementing relatively straightforward construction solutions.

In certain embodiments, the method comprises moving an extrusion die about the longitudinal axis of the pipeline, to extrude the protective sheeting and simultaneously wind the protective sheeting about the pipeline as the protective sheeting is extruded; and moving at least two heaters, located at respective end portions, about the pipeline, to concentrate heat transfer at the end portions. This way, heat can be transferred locally.

In certain embodiments, the method comprises a first protective sheeting compression cycle performed simultaneously with winding the protective sheeting about the pipeline; and a subsequent second protective sheeting compression cycle; the first and second protective sheeting compression cycles being performed in opposite rotation directions about the longitudinal axis of the pipeline. This way, the protecting sheeting and the end portions are kept contacting as they harden.

In certain embodiments, the method comprises moving a roller, which rotates about an axis parallel to the longitudinal axis, about the longitudinal axis of the pipeline. The roller thus exerts pressure in proportion to the plasticity of the protective sheeting, to assist adhesion to the pipeline without altering the conformation of the sheeting.

In certain embodiments, the method comprises controlling the amount of heat transmitted per unit of time to the end portions as a function of the speed at which the protective sheeting is applied. This way, it is possible to roughly determine the thickness of the surface layers of the end portions to be softened at the heating step.

A further advantage of the present disclosure is to provide a device configured to apply protective sheeting of polymer material to a pipeline, and in particular a device configured to eliminate certain of the drawbacks of certain of the known art.

According to the present disclosure, there is provided a device configured to apply protective sheeting of polymer material to a pipeline; the pipeline extending along a longitudinal axis and comprising a cutback bounded at opposite axial ends by two end portions of respective protective coatings of polymer material; and the device comprising a carriage which rotates about the pipeline; an extrusion die configured to extrude and simultaneously wind about the pipeline a protective sheeting wide enough to cover the cutback and the end portions; a heat treating unit comprising at least two heaters configured to direct and confine heat onto the end portions and configured to directly heat the free faces of the end portions; and a roller configured to compress the protective sheeting against the pipeline, the end portions included, the extrusion die and the heat treating unit being mounted on the carriage so that the heaters are located between the extrusion die and the pipeline.

Additional features and advantages are described in, and will be apparent from the following Detailed Description and the figures.

BRIEF DESCRIPTION OF THE DRAWINGS

Certain embodiments of the present disclosure will be described by way of example with reference to the attached drawings, in which:

FIG. 4 shows a larger-scale, partly sectioned, lateral elevation, with parts removed for clarity, of the device configured to apply protective sheeting to a pipeline in accordance with a third embodiment of the present disclosure.

DETAILED DESCRIPTION

Figure 1:
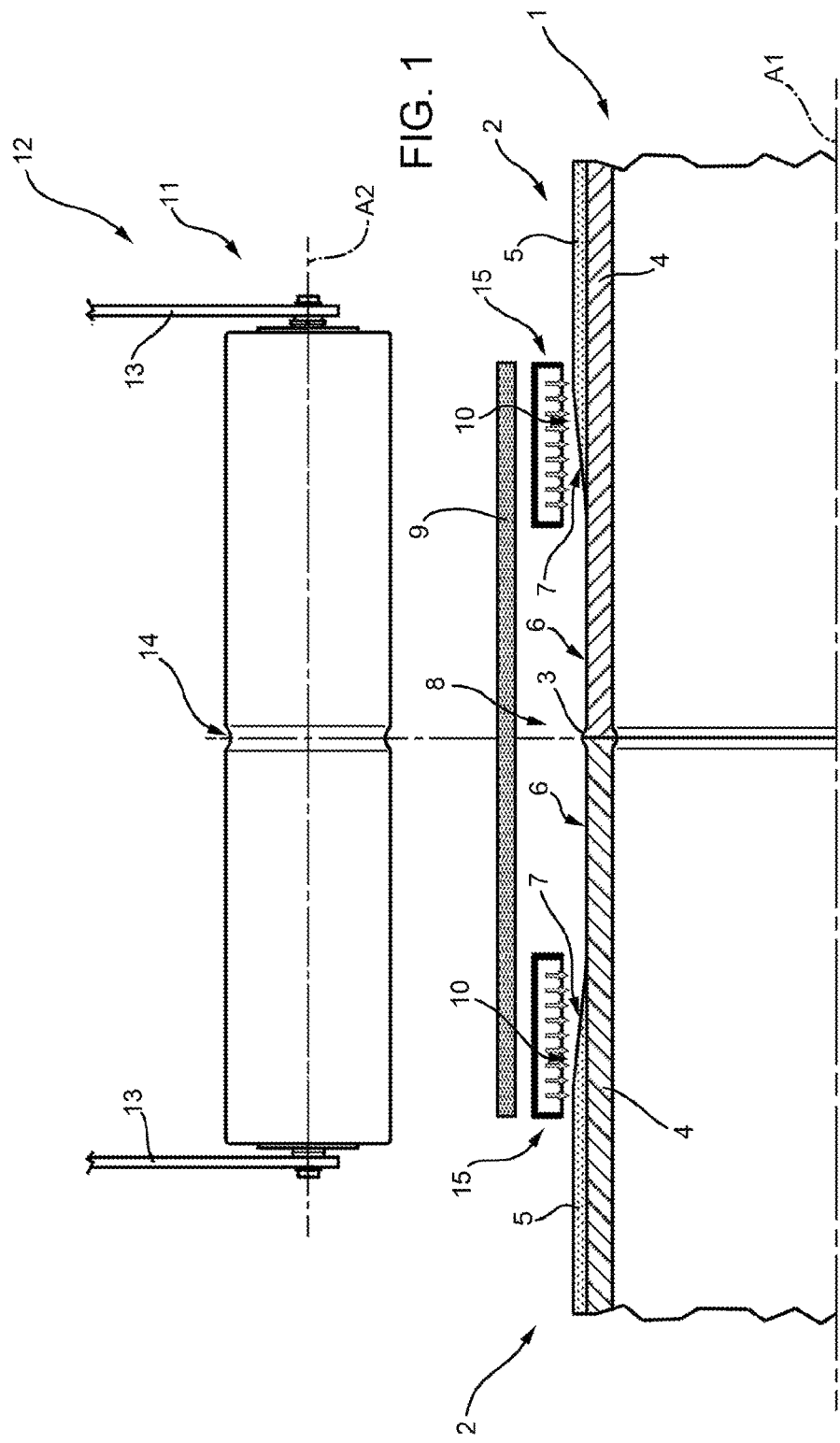
FIG. 1 shows a partly exploded, partly sectioned schematic, with parts removed for clarity, of one step in the method according to the present disclosure.

Referring now to the example embodiments of the present disclosure illustrated in FIGS. 1 to 4, number 1 in FIG. 1 indicates a pipeline composed of two pipes 2 joined by a weld, of which is shown an annular weld bead 3. Each pipe 2 comprises a metal cylinder 4; and a coating 5 of polymer material, normally polyethylene or polypropylene, for corrosion-proofing metal cylinder 4.

Each pipe 2 has two opposite free ends 6 (only one shown in FIG. 1) with no coatings 5. Each coating 5 has a bevel 7 at each free end 6. Two pipes 2 welded together form a cutback 8, which extends along a longitudinal axis A1, between two successive bevels 7.

In addition to welding metal cylinders 4, joining pipes 2 also comprises coating cutback 8. This comprises applying protective sheeting 9 of polymer material to pipeline 1, at cutback 8.

In the example shown, protective sheeting 9 is configured to wind around cutback 8, is wider than cutback 8 (measured along longitudinal axis A1) so as to overlap coatings 5 and relative bevels 7 of the two joined pipes 2, and is long enough to wind completely around the perimeter of cutback 8. In other words, protective sheeting 9 is superimposed on two end portions 10 of respective coatings 5. Each end portion 10 comprises a bevel 7 and a cylindrical part of coating 5. In certain embodiments, the amount by which protective sheeting 9 overlaps the two pre-existing coatings 5 ranges between 50 and 100 mm measured parallel to longitudinal axis A1, which means the width of each end portion ranges between 50 and 100 mm.

In certain embodiments, protective sheeting 9 is extruded and wound simultaneously about pipeline 1, and is compressed onto pipeline 1 by a roller 11.

The newly extruded protective sheeting 9 is soft, in the sense that the polymer material has first been plastified to extrude the protective sheeting, and has not yet hardened. So the protective sheeting is highly flexible and adapts to the irregular shape of the part of pipeline 1 to which the protective sheeting is applied. Roller 11 ensures protective sheeting 9 adheres to the surface of pipeline 1 to which the protective sheeting is applied, and prevents the formation of air bubbles, without altering the thickness of protective sheeting 9.

Roller 11 rotates idly, or is powered to rotate, about an axis of rotation A2, and is pushed onto pipeline 1 by a supporting mechanism 12, of which only two supporting arms 13 are shown in FIG. 1.

Roller 11 varies in elasticity along axis A2, and more specifically is of greater elasticity at the ends than at the center. At the center, roller 11 has a groove 14 configured to align with annular weld bead 3.

Number 15 in FIG. 1 indicates a number or quantity of heaters which, in the example shown, define respective hot-air conductor outlets facing and positioned a short distance from end portions 10.

The main purpose of each heater 15 is to heat, and soften a thin surface layer of the free surface of a respective end portion 10.

More specifically, concentrating heat on the free faces of end portions 10 softens the polymer material of coatings 5 along thin surface layers of respective end portions 10, so as to seal end portions 10 to protective sheeting 9, which is wound around pipeline 1 before protective sheeting is completely hardened.

Figure 2:
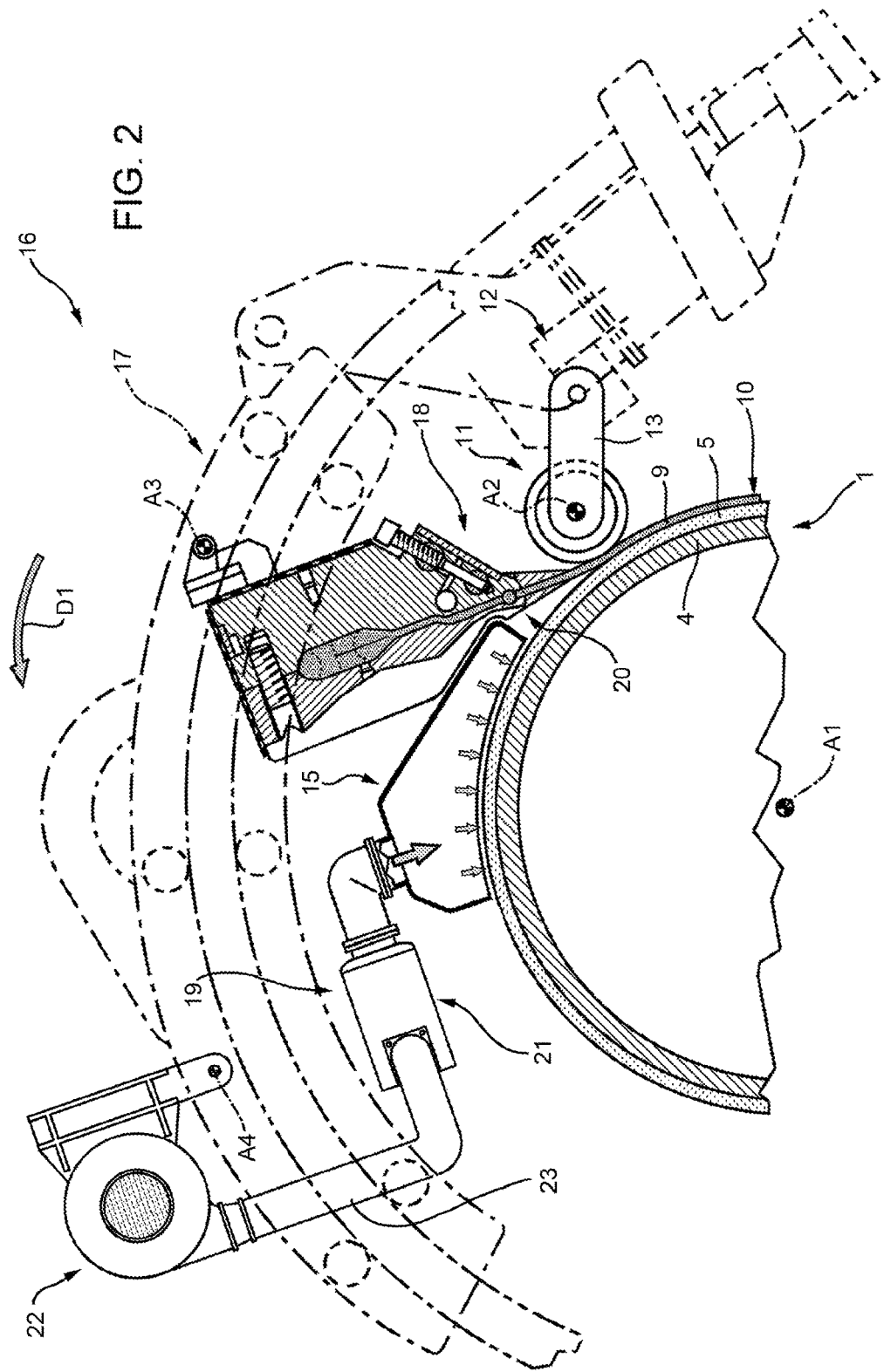
FIG. 2 shows a larger-scale, partly sectioned, lateral elevation, with parts removed for clarity, of the device configured to apply protective sheeting to a pipeline in accordance with a first embodiment of the present disclosure.

Number 16 in FIG. 2 indicates as a whole a device configured to apply protective sheeting 9 to pipeline 1.

Device 16 comprises a carriage 17 which runs along an annular path around pipeline 1; an extrusion die 18 configured to extrude protective sheeting 9; roller 11 configured to compress protective sheeting 9 onto pipeline 1; and a heat treating unit 19 configured to effectively seal end portions 10 to protective sheeting 9.

Extrusion die 18 comprises an extrusion outlet 20 from which protective sheeting 9 comes out, and is mounted on carriage 17 to pivot about an axis A3 to enable actuators (not shown in the drawings) to adjust the tilt of extrusion die 18 and the distance between extrusion outlet 20 and pipeline 1.

Roller 11 is connected to carriage 17 by arms 13 and is adjustable by actuators (not shown).

Heat treating unit 19 is mounted on carriage 17, such as pivotably mounted about an axis A4 and adjustably by actuators (not shown in the drawings), and comprises a heat source 21, two fans 22 (only one shown in FIG. 2), heaters 15 (only one shown in FIG. 2), and conduits 23 (only one shown in FIG. 2) configured to connect heat source 21, fans 22, and heaters 15. Heat source 21 is selected on the basis of energy demand and other contingencies. The types of heat sources 21 comprise: infrared lamps, gas burners, and electric resistors.

In actual use, carriage 17 is run in direction D1 in FIG. 2. And, as carriage 17 runs along, heat treating unit 19 heats end portions 10, substantially by convection, to soften surface layers of end portions 10; extrusion die 18 extrudes protective sheeting 9 close to pipeline 1, so that protective sheeting 9 is deposited, still partly softened, onto pipeline 1, and in particular onto end portions 10; and roller 11 compresses protective sheeting 9 onto pipeline 1, and in particular onto end portions 10, so that surface layers of the still-soft protective sheeting 9 adhere firmly to the soft surface layers of end portions 10.

Once the whole length of protective sheeting 9 is wound about pipeline 1, extrusion is stopped, extrusion die 18 and heaters 15 may be withdrawn from pipeline 1, but roller 11 continues to exert pressure on pipeline 1.

Next, carriage 17 is run in the opposite direction to direction D1 to perform a rolling operation (i.e., with roller 11 still exerting pressure to compress protective sheeting 9 as protective sheeting hardens).

In the example shown, heaters 15 concentrate the hot airflow within circumscribed areas.

Figure 3:
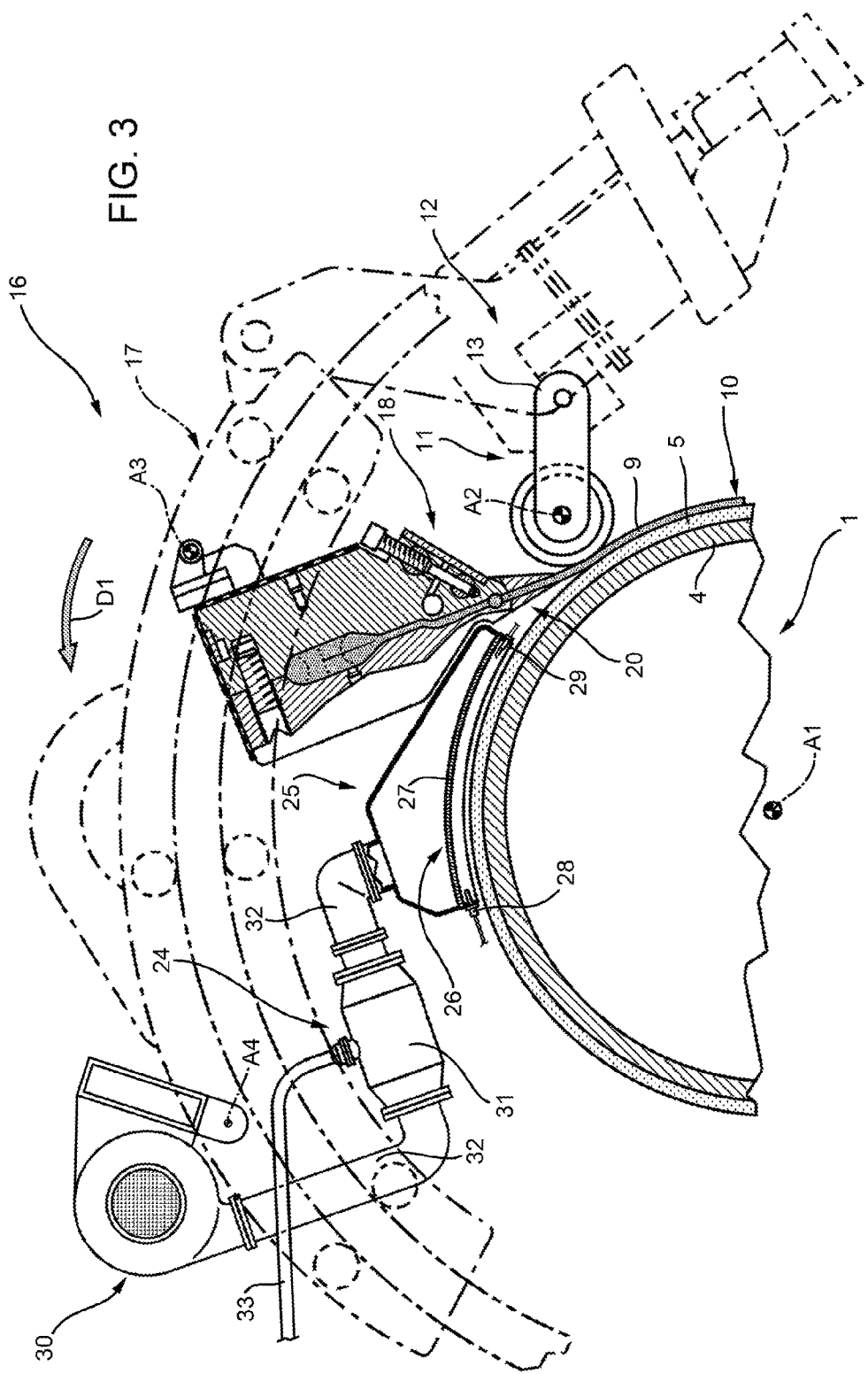
FIG. 3 shows a larger-scale, partly sectioned, lateral elevation, with parts removed for clarity, of the device configured to apply protective sheeting to a pipeline in accordance with a second embodiment of the present disclosure.

In the FIG. 3 embodiment, the heat treating unit 24 comprises two heaters 25 (only one shown in FIG. 3); and two heat sources 26 (only one shown in FIG. 3) inside respective heaters 25 which, in the example shown, are outlets facing end portions 10 and configured to house respective heat sources 26.

In the example shown, each heat source 26 is defined by a gas burner configured to generate and direct a flame onto a respective end portion 10. More specifically, each heat source 26—in the example shown, each burner—comprises an arc-shaped diffuser 27 which, in use, is positioned facing and close to a respective end portion 10.

Heat treating unit 24 also comprises a flame sensor 28 and an ignition device 29, both located inside heater 25.

Heat treating unit 24 comprises a fan 30; a mixer valve 31; a conduit 32 configured to conduct air and the air/gas mixture to diffuser 27; and a conduit 33 configured to feed gas to mixer valve 31.

In actual use, heat treating unit 24 provides for igniting the heat source 26 and moving carriage 17. The flame is evenly distributed along diffuser 27, sweeps the outer face of a respective end portion 10, and softens a thin surface layer of end portion 10 to join end portion more effectively to protective sheeting 9.

Number 34 in FIG. 4 indicates as a whole a heat treating unit comprising a heater 35; and a radiant heat source 36, (e.g., infrared lamps, electric resistors, or a gas emitter).

Heat source 36 is housed inside heater 35, which serves to concentrate radiation along a respective end portion 10.

Clearly, changes may be made to the embodiments of the present disclosure described with reference to the attached drawings without, however, departing from the protective scope of the accompanying Claims. For example, the free faces of the end portions may be heated directly by conduction, using heated rollers configured to roll along the end portions, or other heated elements configured to slide along the end portions. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A pipeline protective sheeting application device comprising:
   a carriage rotatable about a pipeline extending along a longitudinal axis and including a cutback bounded at opposite axial ends by two end portions of respective protective coatings of a polymer material;

an extrusion die mounted on the carriage, wherein in use, the extrusion die simultaneously winds about the pipeline and extrudes a protective sheeting of polymer material wide enough to cover the cutback and the end portions;

a heat treating unit mounted on the carriage and including at least two heaters, wherein the at least two heaters are located between the extrusion die and the pipeline, and in use, said heat treating unit directs and confines heat onto the end portions to directly heat free faces of the end portions; and a roller configured to compress the protective sheeting against the pipeline including the end portions.

2. The pipeline protective sheeting application device of claim 1, wherein in use, the at least two heaters soften, by directly heating, a surface layer of each end portion before the protective sheeting, not completely hardened, is applied onto the softened surface layers.

3. The pipeline protective sheeting application device of claim 2, wherein in use, the at least two heaters direct and confine at least one of hot air, radiation and a flame onto the free faces of the end portions.

4. The pipeline protective sheeting application device of claim 1, wherein the heat treating unit includes at least one heat source selected from: an infrared lamp, an electric resistor, a gas emitter, and a gas burner.

5. The pipeline protective sheeting application device of claim 4, wherein the heat treating unit includes:

a fan which, in use, generates a hot airflow which intercepts the at least one heat source; and a heater which, in use, directs and confines the hot airflow onto the free faces of the end portions.

6. The pipeline protective sheeting application device of claim 4, wherein the heat treating unit includes at least two heat sources which, operation, generate and direct flames onto respective end portions.

7. The pipeline protective sheeting application device of claim 4, wherein the heat treating unit includes at least two heat sources which, in use, generate and direct an electromagnetic radiation onto the end portions.

* * * * *